(12) United States Patent
Sasaki (10) Patent No.: US 8,922,138 B2
(45) Date of Patent: Dec. 30, 2014

(54) CONTROL CIRCUIT FOR LIGHT EMITTING APPARATUS

(71) Applicant: Rohm Co., Ltd., Kyoto (JP)

(72) Inventor: Yoshikazu Sasaki, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 14/066,009

(22) Filed: Oct. 29, 2013

(65) Prior Publication Data

US 2014/0125246 A1 May 8, 2014

(30) Foreign Application Priority Data

Oct. 29, 2012 (JP) .................. 2012-238361

(51) Int. Cl.
*H05B 33/08* (2006.01)

(52) U.S. Cl.
CPC ............. *H05B 33/0845* (2013.01); *Y02B 20/46* (2013.01)
USPC ............................ 315/308; 315/224; 315/360

(58) Field of Classification Search
CPC ........ H05B 37/00; H05B 37/02; H05B 33/00; H05B 33/02; H05B 33/08; H05B 33/0815; H05B 33/0821; H05B 33/0824; H05B 33/083; H05B 33/0845; H05B 33/0848; H05B 33/0851
USPC ............. 315/307, 308, 291, 360, 224, 200 R, 315/185 R
See application file for complete search history.

(56) References Cited

U.S. PATENT DOCUMENTS

| 7,741,787 B2* | 6/2010 | Chen et al. ..................... 315/224 |
| 2011/0115395 A1* | 5/2011 | Barrow et al. ................. 315/250 |
| 2012/0249001 A1* | 10/2012 | Okubo et al. ............. 315/200 R |

FOREIGN PATENT DOCUMENTS

JP 2009261158 A 11/2009

* cited by examiner

*Primary Examiner* — David H Vu
(74) *Attorney, Agent, or Firm* — Cantor Colburn LLP (57) ABSTRACT

A first driver switches on and off a driving current $I_{LED}$ according to a first pulse signal which is pulse-width modulated according to an externally supplied target luminance level of a light emitting element. An oscillator generates a cyclic signal $S_{OSC}$ having a predetermined frequency. A pulse modulator generates a second pulse signal which is switched to an on level that corresponds to the on state of a switching transistor in synchronization with the cyclic signal $S_{OSC}$, and which is switched to an off level that corresponds to the off state according to a feedback voltage. A second driver switches on and off the switching transistor according to the second pulse signal. The oscillator is configured to be reset according to a first edge which is transition of the first pulse signal from a first level that corresponds to the off state to a second level that corresponds to the on state.

18 Claims, 10 Drawing Sheets

CONTROL CIRCUIT FOR LIGHT EMITTING APPARATUS

CROSS REFERENCE TO RELATED APPLICATIONS

This application claims priority under 35 U.S.C. §119(a) to Japanese Application No. 2012-238361, filed Oct. 29, 2012, the disclosure of which is also incorporated herein by reference.

BACKGROUND OF THE INVENTION

1. Field of the Invention

The present invention relates to a driving technique for a light emitting element.

2. Description of the Related Art

Figure 1:
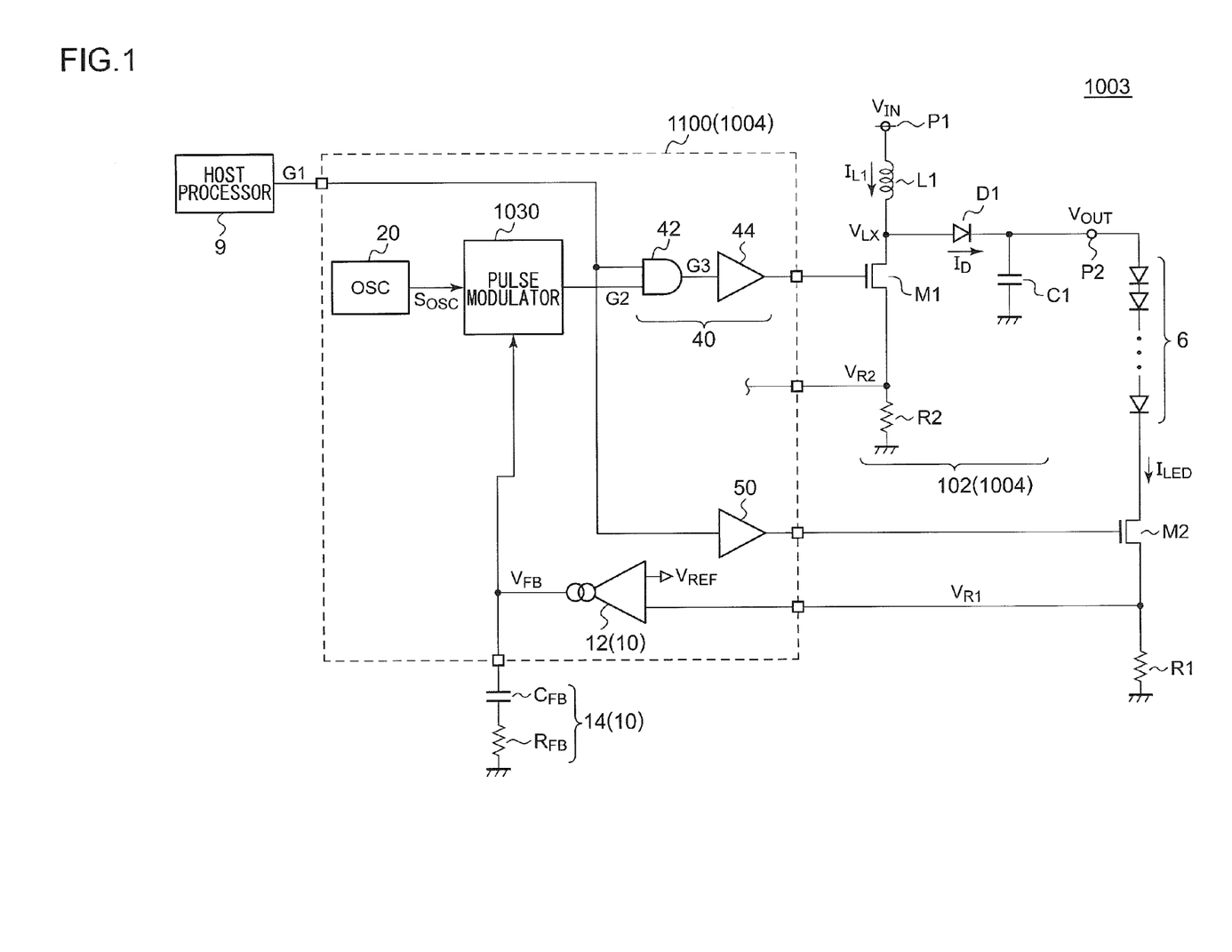
FIG. 1 is a circuit diagram showing an example configuration of a light emitting apparatus according to a comparison technique investigated by the present inventor.

In recent years, as a backlight of a liquid crystal panel or as an illumination device, a light emitting apparatus is employed which is configured using a light emitting element such as an LED (light emitting diode) or the like. FIG. 1 is a circuit diagram showing an example configuration of a light emitting apparatus according to a comparison technique investigated by the present inventor. A light emitting apparatus 1003 includes a single-channel LED string (light emitting element) 6 and a switching power supply 1004.

The light emitting element 6 includes multiple LEDs connected in series. The switching power supply 1004 is configured to step up the input voltage $V_{IN}$ input to an input terminal P1, and to supply a driving voltage $V_{OUT}$ to one end of the light emitting element 6 connected to an output terminal P2.

The switching power supply 1004 includes an output circuit 102 and a control IC (Integrated Circuit) 1100. The output circuit 102 includes an inductor L1, a switching transistor M1, a rectifier diode D1, and an output capacitor C1. The control IC 1100 is configured to control the on/off time ratio (duty ratio) of the switching transistor M1 so as to adjust the driving voltage $V_{OUT}$.

A switch (transistor) M2 for a PWM dimming control operation (which will also be referred to as a "burst dimming control operation") and a first resistor R1 for current detection are provided on a path of the light emitting element 6. The control IC 1100 receives, from a host processor 9, a first pulse signal G1 used for the PWM dimming control operation and having a duty ratio adjusted according to the target luminance level of the light emitting element 6. The first driver 50 is configured to switch on and off the dimming switch M2 according to the first pulse signal G1.

A voltage drop (detection voltage) $V_{R1}$ develops at the first resistor R1 in proportion to the driving current $I_{LED}$ that flows through the light emitting element 6. The error amplifier 10 is configured to amplify the difference between the detection voltage $V_{R1}$ and a predetermined reference voltage $V_{REF}$, so as to generate a feedback voltage $V_{FB}$. The error amplifier 10 includes a transconductance (gm) amplifier 12 and a phase compensating circuit 14, for example. The phase compensating circuit 14 includes a capacitor $C_{FB}$ and a resistor $R_{FB}$ used for phase compensation.

An oscillator 20 is configured to generate a cyclic signal $S_{OSC}$ having a predetermined frequency. A pulse modulator 1030 is configured to operate in synchronization with the cyclic signal $S_{OSC}$, and to generate a second pulse signal G2 pulse modulated according to the feedback voltage $V_{FB}$. A second driver 40 includes an AND gate 42 and a main driver 44. In an off period in which the first pulse signal G1 is set to a first level (low level), the second driver 40 is configured to turn off the switching transistor M1. In an on period in which the first pulse signal G1 is set to a second level (high level), the second driver 40 is configured to switch on and off the switching transistor M1 according to a third pulse signal G3 that corresponds to the second pulse signal G2.

A second resistor R2 is provided in order to detect a current $I_{L1}$ that flows through the inductor (coil) L1. During the on time of the switching transistor M1, a voltage drop $V_{R2}$ develops across the second resistor R2 in proportion to the coil current $I_{L1}$. The control IC 1100 is configured to prevent the voltage drop $V_{R2}$ from exceeding a predetermined threshold value and thereby provides overcurrent protection. Furthermore, in a case in which the switching power supply 1004 is configured as a peak current mode DC/DC converter or an average current mode DC/DC converter, the duty ratio of the second pulse signal G2 is adjusted according to the voltage drop $V_{R2}$.

Figure 2A:
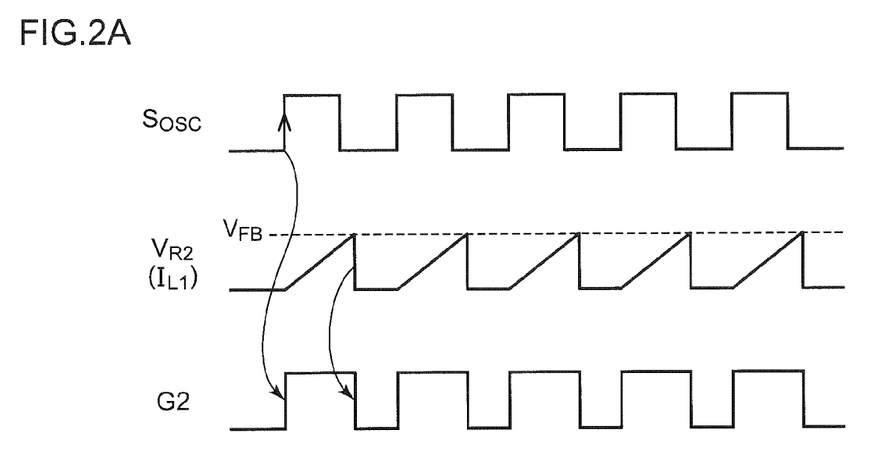
FIGS. 2A and 2B are operation waveform diagrams each showing the operation of the light emitting apparatus shown in FIG. 1.
Figure 2B:
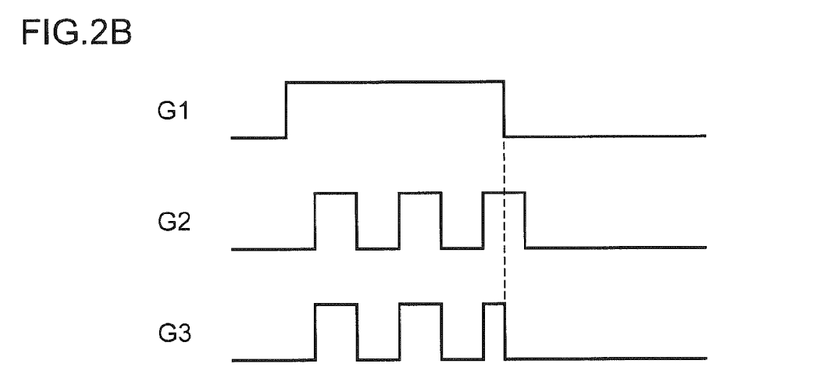

FIGS. 2A and 2B are operation waveform diagrams each showing the light emitting apparatus 1003 shown in FIG. 1. FIG. 2A shows the operation of the pulse modulator 1030. The oscillator 20 is configured to oscillate with a predetermined frequency. The second pulse signal G2 is set to high level according to a positive edge of the cyclic signal $S_{OSC}$, which turns on the switching transistor M1. When the switching transistor M1 is turned on, the coil current $I_{L1}$ that flows through the inductor L1 rises with time. As a result, the voltage drop $V_{R2}$ at the second resistor R2 rises in proportion to the coil current $I_{L1}$. When the voltage drop $V_{R2}$ reaches the feedback voltage $V_{FB}$, i.e., when the coil current $I_{L1}$ reaches a peak current $I_{PEAK}$, the second pulse signal G2 is set to low level, which turns off the switching transistor M1. Subsequently, upon receiving a positive edge of the cyclic signal $S_{OSC}$, the second pulse signal G2 is set to high level again, which turns on the switching transistor M1. The pulse modulator 1030 is configured to repeatedly perform the aforementioned operation.

FIG. 2B shows the PWM dimming control operation. The pulse modulator 1030 is configured to generate the second pulse signal G2. During the on period in which the first pulse signal G1 is set to high level, the first driver 50 is configured to turn on the dimming switch M2, and the second driver 40 is configured to switch on and off the switching transistor M1 according to the second pulse signal G2. During the off period in which the first pulse signal G1 is set to low level, the first driver 50 is configured to turn off the dimming switch M2, and the second driver 40 is configured to suspend the switching of the switching transistor M1.

With such a configuration described above, during the on period in which the dimming switch M2 is turned on, a feedback operation is performed such that the detection voltage $V_{R1}$ matches the reference voltage $V_{REF}$, thereby stabilizing the driving current $I_{LED}$ such that the relation $I_{LED} = V_{REF}/R1$ holds true. By changing the duty ratio of the switching of the dimming switch M2 using the driving current $I_{LED}$ thus stabilized as a reference voltage, such an arrangement is capable of changing the time average quantity of the current that flows through the light emitting element 6. Thus, such an arrangement allows the luminance level of the light emitting element 6 to be changed according to the duty ratio. Related techniques have been disclosed in Japanese Patent Application Laid Open No. 2009-261158, for example.

Figure 3:
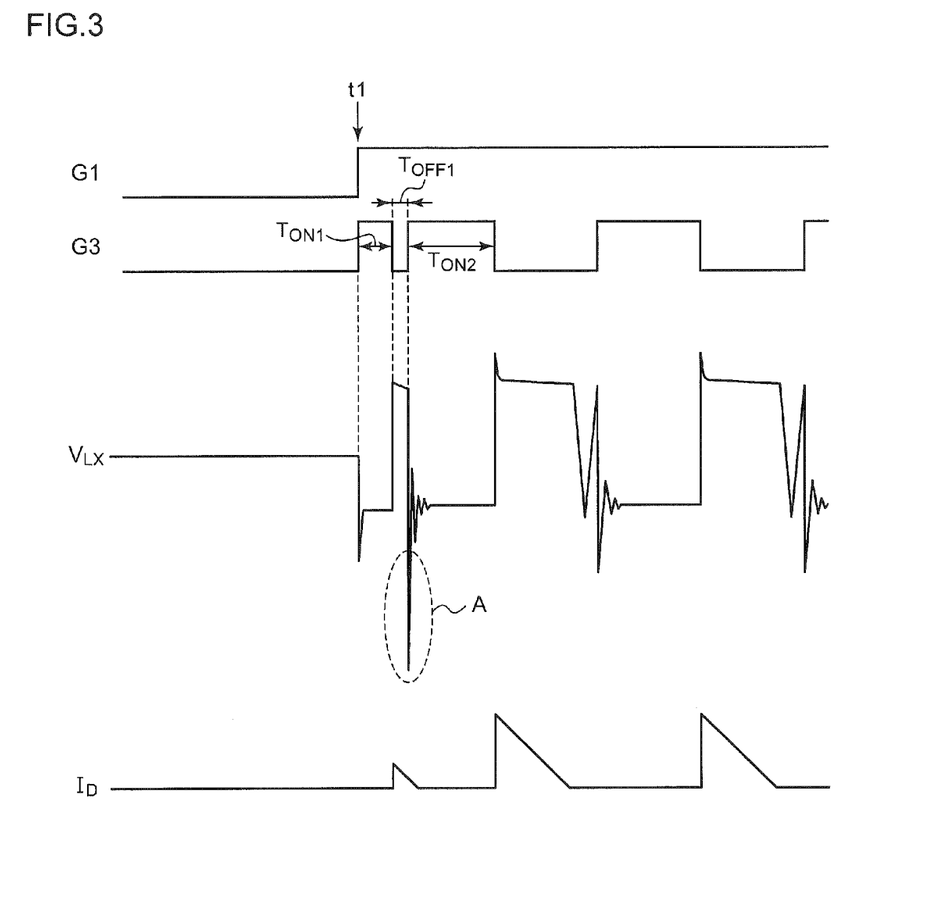
FIG. 3 is a waveform diagram for describing a problem of the light emitting apparatus shown in FIG. 1.

The present inventor has investigated such a light emitting apparatus including a single-channel LED string shown in FIG. 1, and has come to recognize the following problem. FIG. 3 is a waveform diagram showing a problem of the light emitting apparatus 1003 shown in FIG. 1. FIG. 3 shows the first pulse signal G1, the third pulse signal G3, the electric potential $V_{LX}$ at a connection node that connects the inductor L1 and the switching transistor M1, and the current $I_D$ that flows through the rectifier diode D1.

With the control IC 1100 shown in FIG. 1, the oscillator 20 operates in a free-running state. Thus, shown in FIG. 1, the cyclic signal $S_{OSC}$ and the first pulse signal G1 are generated non-synchronously. Thus, depending on the timing t1 at which the first pulse signal G1 transits from low level to high level, an irregular third pulse signal G3 is generated after the light emitting apparatus is turned on. Specifically, the off period $T_{OFF1}$ of the switching transistor M1 is short immediately after the on period $T_{ON1}$ thereof.

The switching transistor M1 is turned on again ($T_{ON2}$) after such a short off period $T_{OFF1}$, and, as indicated by the area encircled by a broken line (A) in FIG. 3, the back electromotive force $V_{LX}$ that develops at the node LX greatly swings in the negative direction. Thus, there is a need to configure each of the switching transistor M1, the inductor L1, and the rectifier diode D1 of the output circuit 102 as a high-voltage element having a high breakdown voltage that is equal to or higher than the back electromotive force $V_{LX}$. This leads to a problem of a high cost and a problem of an increased circuit area.

It should be noted that such a phenomenon in which the back electromotive force $V_{LX}$ greatly swings in the negative direction immediately after the transition from the off period to the on period in the PWM dimming control operation, and the cause of this phenomenon, have been uniquely studied by the present inventors, and are by no means within the scope of common and general knowledge of those skilled in this art.

Also, such a problem not only occurs in the light emitting apparatus 1003 shown in FIG. 1, but can also occur in a light emitting apparatus including a constant current driver instead of the first resistor R1.

SUMMARY OF THE INVENTION

The present invention has been made in order to solve such a problem. Accordingly, it is an exemplary purpose of an embodiment of the present invention to provide a control circuit for a light emitting apparatus which is capable of suppressing a back electromotive force that occurs immediately after the transition from the lighting off period to the lighting on period in the PWM dimming control operation.

A control circuit according to an embodiment of the present invention relates to a control circuit used for a light emitting apparatus. The light emitting apparatus comprises a light emitting element and a switching power supply configured to supply a driving voltage to one end of the light emitting element. The control circuit is configured to control a switching transistor included in the switching power supply, and to switch on and off a driving current that flows through the light emitting element.

The control circuit comprises: a first driver configured to receive a first pulse signal which is pulse width modulated according to a target luminance level of the light emitting element, supplied from a circuit external to the control circuit, and to switch on and off the driving current according to the first pulse signal; an oscillator configured to generate a cyclic signal having a predetermined frequency; a pulse modulator configured to generate as second pulse signal, wherein the second pulse signal transits to an on level that corresponds to an on state of the switching transistor in synchronization with the cyclic signal, and transits to an off level that corresponds to an off state of the switching transistor according to at least one voltage that develops at a node of the light emitting apparatus which is supplied as a feedback voltage; and a second driver configured to switch on and off the switching transistor according to the second pulse signal. The oscillator is configured to be reset according to a first edge which is a transition of the first pulse signal from a first level that corresponds to the off state of the light emitting element to a second level that corresponds to its on state.

With such an embodiment, when a transition occurs from the off period to the on period in the PWM dimming control operation, the oscillator is reset according to the first pulse signal. Thus, such an arrangement is capable of suppressing the occurrence of a short off time after the first on time of the switching transistor. As a result, such an arrangement is capable of preventing the back electromotive force that occurs at the coil of the switching power supply from greatly swinging in the negative direction when the switching transistor is turned on again immediately after the off time.

The control circuit according to an embodiment may further comprises a reset circuit configured to receive the first pulse signal, and (i) when a first level period immediately before the first edge of the first pulse signal is longer than a predetermined period of time, to reset the oscillator at a timing of the first edge, and otherwise (ii) when the first level period immediately before the first edge of the first pulse signal is shorter than the predetermined period of time, to reset the oscillator after the predetermined period of time elapses after the occurrence of a second edge which is a transition of the first pulse signal from the second level to the first level immediately before the first edge.

Even with an arrangement in which the oscillator is configured to be reset according to the first edge of the first pulse signal, when the first pulse signal has a large duty ratio such that the off time is reduced to a value on the order of the period of the cyclic signal, in some cases, the off time of the first pulse signal itself functions as the off time of the switching transistor. This leads to a problem of the occurrence of a large back electromotive force. With such an embodiment including such a reset circuit, such an arrangement is capable of preventing the back electromotive force that occurs at the coil of the switching power supply from greatly swinging in the negative direction even if the first pulse signal has a large duty ratio.

Also, the reset circuit may comprise: a timer circuit configured to generate a delay signal having a level which changes after the predetermined period of time elapses after the second edge occurs in the first pulse signal; and a logical gate configured to reset the oscillator according to the first pulse signal and the delay signal.

Also, the light emitting apparatus may further comprise a dimming switch and a first resistor arranged in series between the other end of the light emitting element and a fixed voltage terminal. Also, the control circuit may further comprise an error amplifier configured to amplify the difference between a first detection voltage that corresponds to a voltage drop across the first resistor and a reference voltage, so as to generate a feedback signal. Also, the pulse modulator may be configured to adjust a duty ratio of the second pulse signal according to the feedback signal. Also, the first driver may be configured to switch on and off the dimming switch according to the first pulse signal.

Also, the pulse modulator may comprise: a duty controller configured to assert an off signal according to the feedback signal; and a flip-flop configured to receive the cyclic signal and the off signal, and to generate the second pulse signal.

Also, the duty controller may be configured to assert the off signal according to a second detection voltage that corresponds to a current that flows through a coil of the switching power supply, in addition to according to the feedback signal.

Also, the switching power supply may further comprise a second resistor arranged in series with the switching transistor. Also, the second detection voltage may be generated according to a voltage drop across the second resistor.

Also, the light emitting apparatus may further comprise a current driver connected to the other end of the light emitting element, and configured to be switchable between an on state in which a driving current is generated, and an off state in which the supply of the driving current is suspended. Also, the control circuit may further comprise an error amplifier configured to amplify a difference between a first detection voltage that corresponds to a voltage drop across the current driver and a reference voltage, so as to generate a feedback signal. Also, the pulse modulator may be configured to adjust the duty ratio of the second pulse signal according to the feedback signal. Also, the first driver may be configured to switch the current driver between the on state and the off state according to the first pulse signal.

Also, the pulse modulator may comprise: a duty controller configured to assert an off signal according to the feedback signal; and a flip-flop configured to receive the cyclic signal and the off signal, and to generate the second pulse signal.

Also, the duty controller may be configured to assert the off signal according to a second detection voltage that corresponds to a current that flows through a coil of the switching power supply, in addition to according to the feedback signal.

Also, the switching power supply may further comprise a second resistor arranged in series with the switching transistor. Also, the second detection voltage may be generated according to a voltage drop across the second resistor.

Also, the second driver may comprise: a logical gate configured to perform a logical operation on the second pulse signal and the first pulse signal; and a main driver configured to switch on and off the switching transistor according to an output signal of the logical gate.

Also, the control circuit may be monolithically integrated on a single semiconductor substrate.

Also, the light emitting element may be configured as an LED string comprising multiple light emitting diodes connected in series.

Another embodiment of the present invention relates to a light emitting apparatus. The light emitting apparatus may comprise: a light emitting element; and a switching power supply configured to supply a driving voltage to one end of the light emitting element. Also, the switching power supply may comprise: a switching transistor; and the aforementioned control circuit configured to switch on and off the switching transistor.

Yet another embodiment of the present invention relates to an electronic device. The electronic device comprises: a liquid crystal panel; and the aforementioned light emitting apparatus arranged as a backlight of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 4:
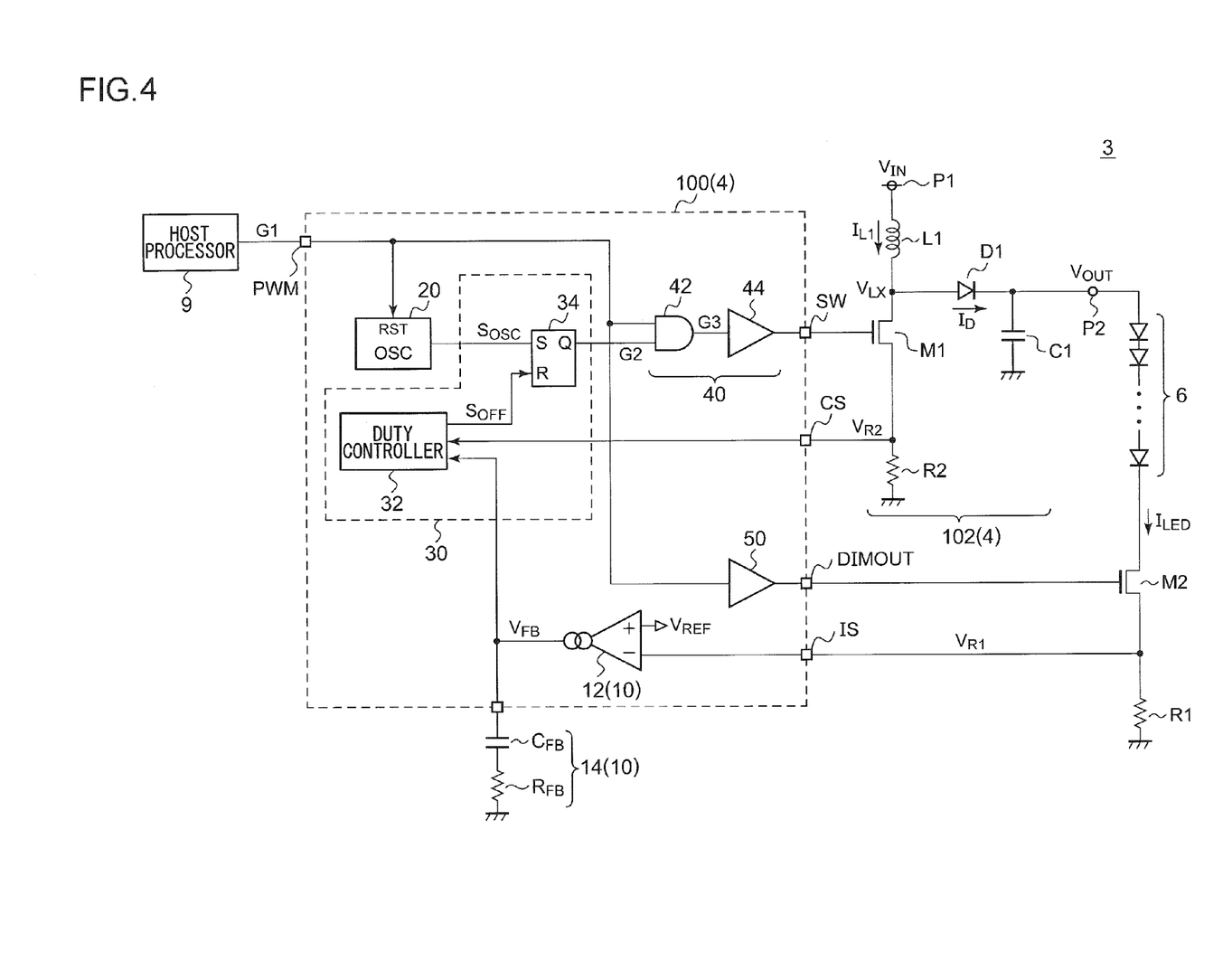
FIG. 4 is a circuit diagram showing a light emitting apparatus including a control IC according to an embodiment.

FIG. 4 is a circuit diagram showing a light emitting apparatus 3 including a control IC 100 according to an embodiment. The light emitting apparatus 3 includes a light emitting element 6, a switching power supply 4, and a host processor 9.

The light emitting element 6 is configured as an LED string including multiple LEDs arranged in series.

The host processor 9 is configured to integrally control the overall operation of the light emitting apparatus 3. Specifically, the light emitting apparatus 3 is configured to generate a first pulse signal G1 which is pulse width modulated according to the target luminance level of the light emitting element 6, and to transmit the first pulse signal G1 thus generated to the control IC 100.

The switching power supply 4 is configured as a step-up DC/DC converter. The switching power supply 4 is configured to step up the input voltage $V_{IN}$ input to its input terminal P1, and to supply a driving voltage $V_{OUT}$ to one end (anode) of the light emitting element 6 connected to its output terminal P2.

The switching power supply 4 includes a control IC 100 and an output circuit 102. The output circuit 102 includes an inductor L1, a rectifier diode D1, a switching transistor M1, and an output capacitor C1. The output circuit 102 has a typical topology, and accordingly, description thereof will be omitted.

A switching terminal SW of the control IC 100 is connected to the gate of the switching transistor M1. The control IC 100 is configured to generate a second pulse signal G2 having a duty ratio adjusted by means of a feedback control operation, so as to provide the output voltage $V_{OUT}$ required to turn on the light emitting element 6, thereby controlling the switching of the switching transistor M1. Furthermore, according to the first pulse signal G1, the control IC 100 is configured to switch on and off the driving current $I_{LED}$ that flows through the light emitting element 6 such that the light emitting element 6 emits light at a target luminance level.

The control IC 100 is configured as a function IC monolithically integrated on a single semiconductor substrate. Examples of such a "monolithically integrated" arrangement include: an arrangement in which all the circuit components are formed on a semiconductor substrate; and an arrangement in which principal circuit components are monolithically integrated. Also, a part of circuit components such as resistors and capacitors may be arranged in the form of components external to such a semiconductor substrate in order to adjust the circuit constants. Also, the switching transistor M1 may be built into the control IC 100.

The light emitting apparatus 3 according to the present embodiment further includes a dimming switch M2 and a first resistor R1 arranged between the other end (cathode) of the light emitting element 6 and a fixed voltage terminal (ground terminal), in addition to the switching power supply 4. The dimming switch M2 and the first resistor R1 are arranged in series with the light emitting element 6, i.e., are provided on a path of the driving current $I_{LED}$.

The control IC 100 includes a switching (SW) terminal, a current detection (CS) terminal, a dimming output (DIMOUT) terminal, a current detection (IS) terminal, and a PWM terminal.

The first pulse signal G1 is input to the PWM terminal from the host processor 9. The SW terminal is connected to the gate of the switching transistor M1, and the DIMOUT terminal is connected to the gate of the dimming switch M2. The FB terminal is connected to a phase compensating circuit 14 including a capacitor $C_{FB}$ and a resistor $R_{FB}$ used for phase compensation. A first detection voltage $V_{R1}$ that corresponds to the voltage drop across the first resistor R1 is input to the IS terminal. A second detection voltage $V_{R2}$ that corresponds to the voltage drop across the second resistor R2 is input to the CS terminal.

The control IC 100 includes a first driver 50, an error amplifier 10, an oscillator 20, a pulse modulator 30, and a second driver 40.

The first driver 50 is configured to switch on and off the dimming switch M2 according to the first pulse signal G1, thereby switching on and off the driving current $I_{LED}$.

The oscillator 20 is configured to generate a cyclic signal $S_{OSC}$ with a predetermined frequency. The pulse modulator 30 is configured to generate the first pulse signal G1 which is pulse modulated in synchronization with the cyclic signal $S_{OSC}$. Specifically, the pulse modulator 30 is configured to switch the first pulse signal G1 to an on level (high level), which corresponds to the on state of the switching transistor M1. Furthermore, the pulse modulator 30 is configured to switch the first pulse signal G1 to an off level (low level), which corresponds to the off state of the switching transistor M1, according to a feedback voltage, i.e., the voltage at at least one node of the light emitting apparatus 3.

The feedback voltage to be fed back to the pulse modulator 30 may be determined according to the modulation mode of the pulse modulator 30. With the present embodiment, the pulse modulator 30 is configured to perform peak current mode control. Thus, as control targets, the first detection voltage $V_{R1}$ that develops at a connection node that connects the first resistor R1 and the dimming switch M2 and the second detection voltage $V_{R2}$ that corresponds to a current that flows through the inductor L1 are fed back to the pulse modulator 30.

The error amplifier 10 includes a gm amplifier 12 and a phase compensating circuit 14. The error amplifier 10 is configured to amplify the difference between the first detection voltage $V_{R1}$ that corresponds to the voltage drop across the first resistor R1 and a predetermined reference voltage $V_{REF}$, so as to generate a feedback voltage $V_{FB}$.

The pulse modulator 30 is configured to adjust the duty ratio of the second pulse signal G2 according to the feedback voltage $V_{FB}$.

The pulse modulator 30 includes a duty controller 32 and a flip-flop 34. The duty controller 32 is configured to assert (set to high level) the off signal $S_{OFF}$ according to the feedback signal $V_{FB}$ and the second detection voltage $V_{R2}$. The configuration of the duty controller 32 is not restricted in particular. Rather, various kinds of known circuits may be employed. For example, the duty controller 32 may include a slope compensation circuit configured to superimpose a phase compensation slope signal on either the second detection voltage $V_{R2}$ or the feedback voltage $V_{FB}$, and a PWM comparator configured to compare the second detection voltage $V_{R2}$ with the feedback voltage $V_{FB}$ so as to generate the off signal $S_{OFF}$. When the second detection voltage $V_{R2}$ reaches the feedback voltage $V_{FB}$, i.e., the coil current $I_{L1}$ that flows through the inductor L1 reaches a peak current $I_{PEAK}$ that corresponds to the feedback voltage $V_{FB}$, the off signal $S_{OFF}$ is asserted.

The flip-flop 34 is configured as an SR flip-flop, for example. The flip-flop 34 is arranged such that the cyclic signal $S_{OSC}$ is input to its set terminal, and the off signal $S_{OFF}$ is input to its reset terminal. Upon receiving a positive edge of the cyclic signal $S_{OSC}$, the second pulse signal G2, which is the output of the flip-flop 34, is switched to high level (on level). When the off signal $S_{OFF}$ is asserted, the second pulse signal G2 is switched to low level (off level). The flip-flop 34 may be exchanged with another kind of flip-flop other than such an SR flip-flop or otherwise a latch circuit, which can be clearly understood by those skilled in this art.

During the off period in which the first pulse signal G1 is set to the first level (low level), the second driver 40 is configured to turn off the switching transistor M1. During the on period in which the first pulse signal G1 is set to the second level (high level), the second driver 40 is configured to switch on and off the switching transistor M1 according to a third pulse signal G3 that corresponds to the second pulse signal G2.

The second driver 40 includes an AND gate 42 and a main driver 44, for example. The AND gate 42 is configured to generate the third pulse signal G3, which is the logical AND of the first pulse signal G1 and the second pulse signal G2. The main driver 44 is configured to switch on and off the switching transistor M1 according to the third pulse signal S3.

The oscillator 20 is configured having a reset terminal RST. The first pulse signal G1 is input to the reset terminal RST. The oscillator 20 is configured to be reset according to a first edge of the first pulse signal G1 across the transition from the first level (low level) which corresponds to the off state of the light emitting element 6 to the second level (high level) which corresponds to its on state. With a logical system in which the first level is a low level and the second level is a high level, the first edge is a positive edge.

The above is the configuration of the light emitting apparatus 3. Next, description will be made regarding the operation thereof.

Figure 5:
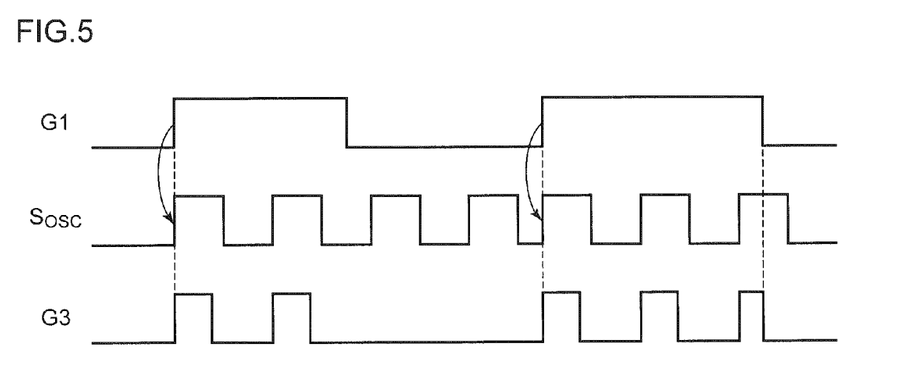
FIG. 5 is an operation waveform diagram showing the operation of the light emitting apparatus shown in FIG. 4.

FIG. 5 is an operation waveform diagram of the light emitting apparatus 3 shown in FIG. 4. The oscillator 20 is reset every time a positive edge occurs in the first pulse signal G1. That is to say, such an arrangement provides timing matching between the positive edge of the first pulse signal G1 and the positive edge of the cyclic signal $S_{OSC}$. As a result, at the same timing as the transition of the first pulse signal G1 to the second level, the third pulse signal G3 is switched to the on level, which turns on the switching transistor M1. That is to say, such an arrangement allows the third pulse signal G3 to have a regular waveform regardless of the timing at which the first pulse signal G1 transits from the first level to the second level. As a result, such an arrangement is capable of preventing the occurrence of a short off time $T_{OFF}$ such as that shown in FIG. 3. Thus, such an arrangement is capable of suppressing the amplitude of the back electromotive force $V_{LX}$.

In addition, as a result of suppressing the amplitude of the back electromotive force $V_{LX}$, such an arrangement allows each of the inductor L1, the switching transistor M1, and the rectifier diode D1 to have a reduced breakdown voltage. Thus, such an arrangement allows the light emitting apparatus 3 to be configured with a reduced size and a reduced cost.

Figure 6:
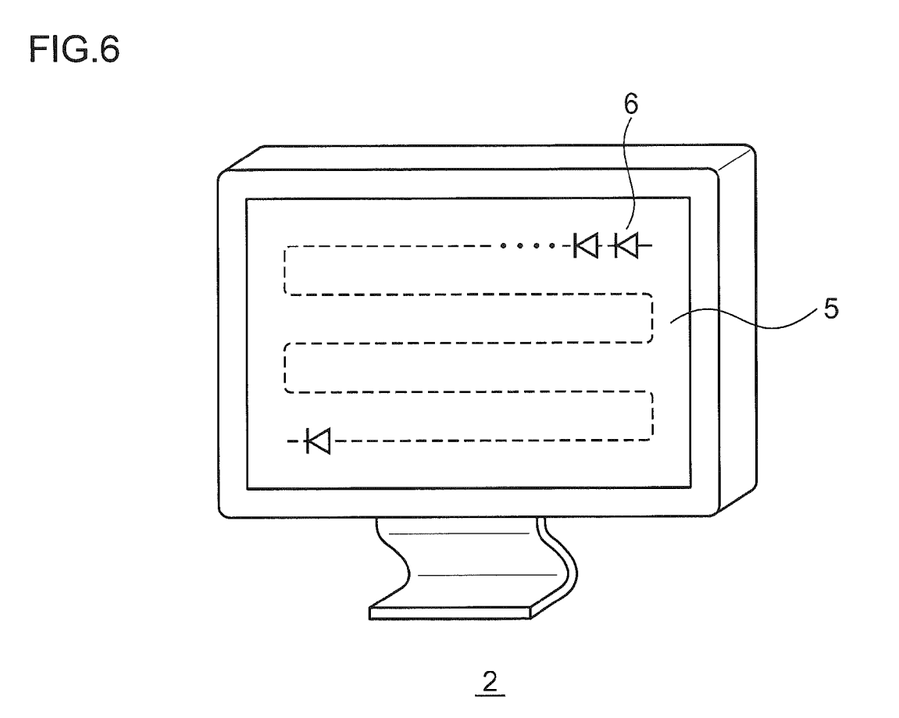
FIG. 6 is a diagram showing an example of an electronic device including the light emitting apparatus shown in FIG. 4.

Next, description will be made regarding the usage of the light emitting apparatus 3. FIG. 6 is a diagram showing an electronic device 2 including the light emitting apparatus 3 shown in FIG. 4. The electronic device 2 is configured as, for example, a liquid crystal display apparatus, a TV image receiver, or a car navigation system display monitor, or as a cellular phone terminal, a tablet PC, an audio player, or the like, including a liquid crystal panel.

The electronic device 2 includes an LCD (Liquid Crystal Display) panel 5. The light emitting element 6 of the light emitting apparatus 3 is arranged as a backlight on the back face of the LCD panel 5. The electronic device 2 includes an unshown switching power supply 4, current driver 8, and host processor 9 as built-in components within a casing of the electronic device 2.

Description has been made with reference to the embodiments regarding the present invention. The above-described embodiments have been described for exemplary purposes only, and are by no means intended to be interpreted restrictively. Rather, various modifications may be made by making various combinations of the aforementioned components or processes. Description will be made below regarding such modifications.

[First Modification]

Figure 7:
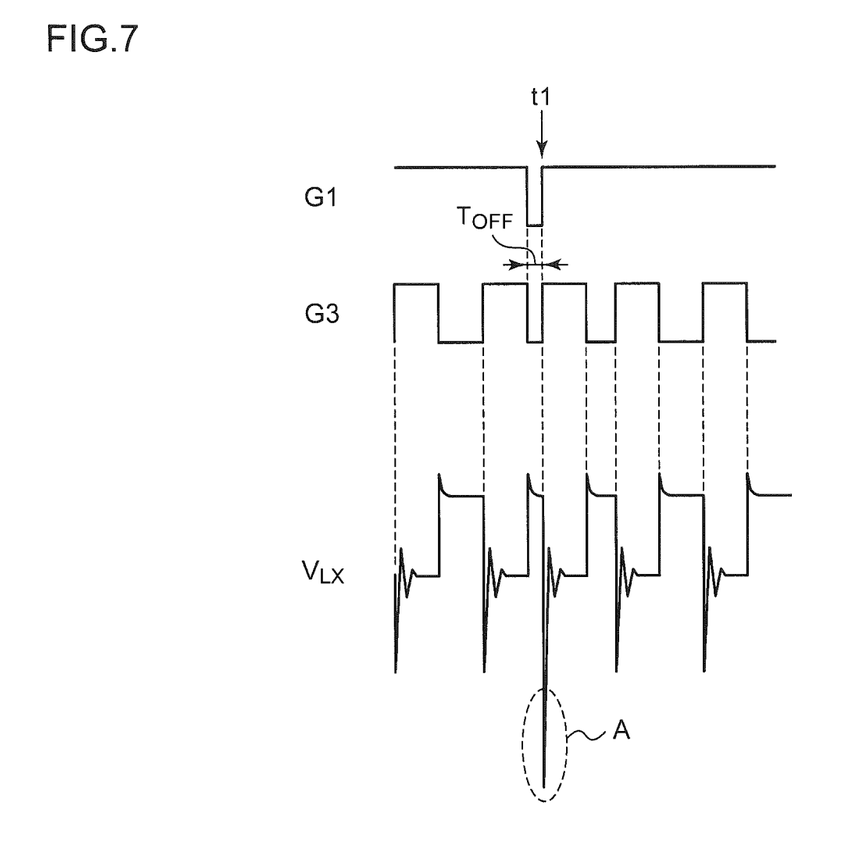
FIG. 7 is a waveform diagram showing the operation of the light emitting apparatus shown in FIG. 4 when the first pulse signal has a short off period.

As described in the embodiment, even with such an arrangement in which the oscillator 20 is configured to be reset according to the first edge of the first pulse signal G1, when the first pulse signal G1 has a large duty ratio such that the off time is reduced to a value on the order of the period of the cyclic signal $S_{OSC}$, in some cases, such a reset operation of the oscillator 20 cannot prevent the third pulse signal G3 from having an irregular waveform. FIG. 7 is a waveform diagram in a case in which the light emitting apparatus 3 shown in FIG. 4 uses the first pulse signal G1 having a short off period. When the first pulse signal G1 transits to the on period at the time point t1 after such a short off period, the short off period immediately after the time point t1 itself functions as the off time of the third pulse signal G3. This leads to a large back electromotive force $V_{LX}$.

Figure 8:
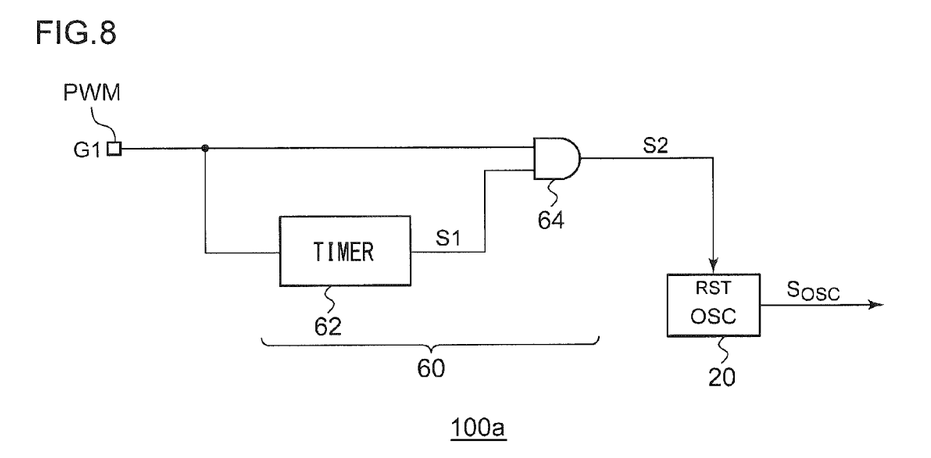
FIG. 8 is a circuit diagram showing a part of the control IC according to a first modification.

Such a problem can be solved by means of a first modification. FIG. 8 is a circuit diagram showing a part of the control IC 100a according to the first modification.

The control IC 100a includes a reset circuit 60, in addition to the control IC 100 shown in FIG. 4.

The reset circuit 60 is configured to receive the first pulse signal G1. (i) When the first level (low level) period immediately before the first edge of the first pulse signal G1 is longer than a predetermined period of time τ, the reset circuit 60 is configured to reset the oscillator 20 at the timing of the first edge. Conversely, (ii) when the first level (low level) period immediately before the first edge of the first pulse signal G1 is shorter than the predetermined period of time τ, the reset circuit 60 is configured to reset the oscillator 20 after the predetermined period of time τ elapses after the second edge (negative edge) which is the transition of the first pulse signal G1 from the second level (high level) to the first level (low level) immediately before the first edge. The predetermined period of time τ is preferably set to a value on the order of the period of the cyclic signal $S_{OSC}$. For example, when the cyclic signal $S_{OSC}$ has a frequency of 50 to 300 kHz (having a period of 3 to 20 μs), the predetermined period of time τ may be set to a value on the order of 0.5 to 10 μs.

The reset circuit 60 includes a timer circuit 62 and a logical gate 64, for example. The timer circuit 62 is configured to generate a delay signal S1 having a level that changes after the predetermined period of time τ elapses after the second edge (negative edge) occurs in the first pulse signal G1. The logical gate 64 is configured to generate a reset signal S2 according to the first pulse signal G1 and the delay signal S1, so as to reset the oscillator 20 at a timing of the positive edge of the reset signal S2. With the control IC 100a shown in FIG. 8, the logical gate 64 is configured as an AND gate. Also, various kinds of logical gates may be employed according to the logical system to be employed, which can be clearly understood by those skilled in this art.

Figure 9A:
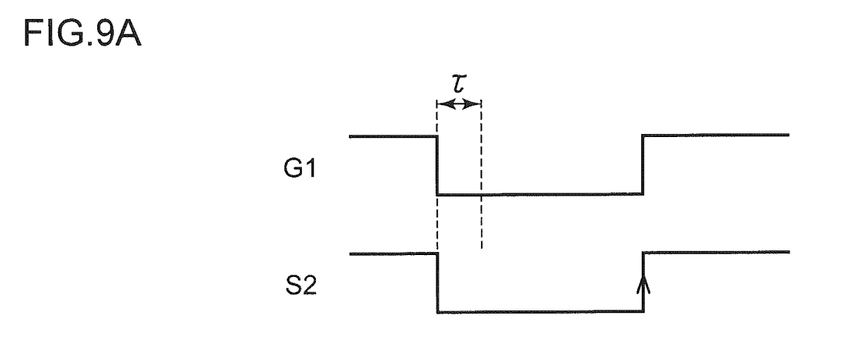
FIGS. 9A and 9B are operation waveform diagrams each showing the operation of a reset circuit.
Figure 9B:
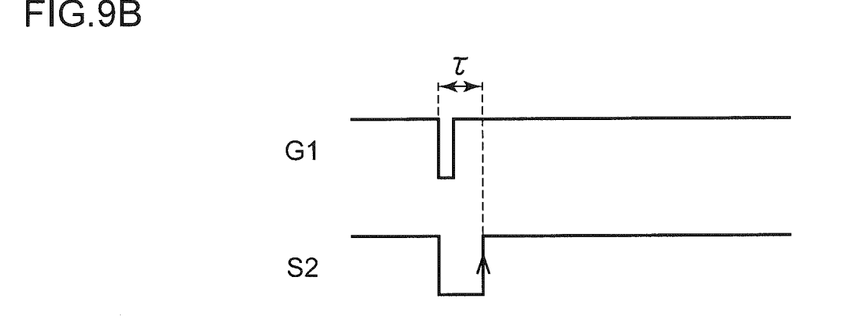
Figure 9C:
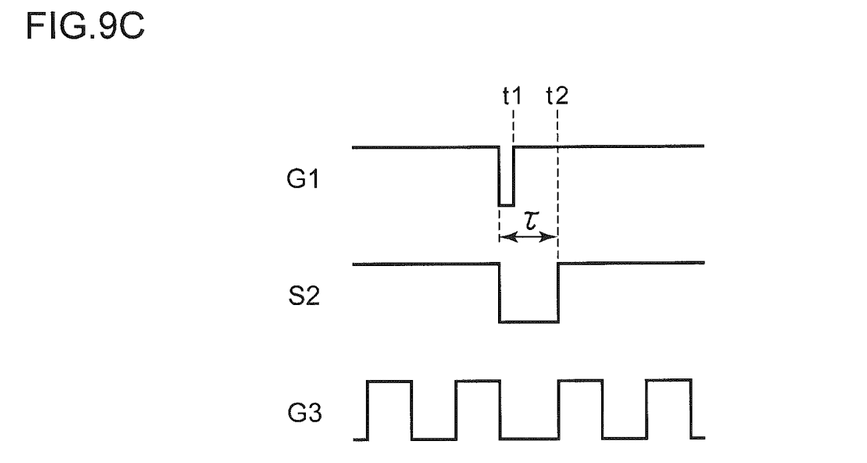
FIG. 9C is a waveform diagram showing the operation of the control IC shown in FIG. 8 when the first pulse signal has a short off period.

FIGS. 9A and 9B are operation waveform diagrams of the reset circuit 60. FIG. 9C is a waveform diagram of the control IC 100a shown in FIG. 8 when the first pulse signal G1 has a short off period. FIG. 9A shows waveforms (i) when the low level period of the first pulse signal G1 immediately before its positive edge is longer than a predetermined period of time τ. FIG. 93 shows waveforms (ii) when the low level period of the first pulse signal G1 immediately before its positive edge is shorter than a predetermined period of time τ.

As shown in FIG. 9C, the oscillator 20 is not reset immediately after the first pulse signal G1 transits to the second level at the time point t1. Subsequently, the oscillator 20 is reset at the time point t2 when the predetermined period of time τ elapses after the time point t1. In this stage, the third pulse signal S3 is set to high level, which turns on the switching transistor M1.

With the first modification including such a reset circuit 60, such an arrangement is capable of suppressing back electromotive force across the coil of the switching power supply even if the first pulse signal G1 has a large duty ratio.

[Second Modification]

Figure 10:
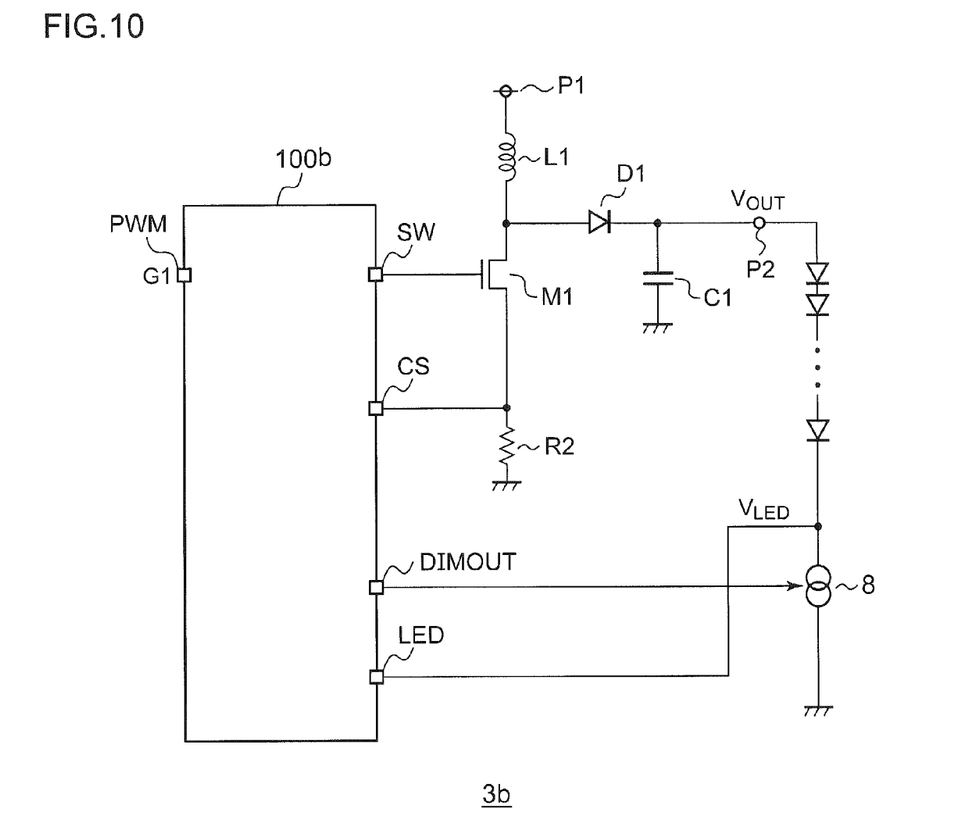
FIG. 10 is a circuit diagram showing a light emitting apparatus according to a second modification.

FIG. 10 is a circuit diagram showing a light emitting apparatus 3b according to a second modification. The light emitting apparatus 3b shown in FIG. 10 includes a current driver

8, instead of the dimming switch M2 and the first resistor R1 included in the light emitting apparatus 3 shown in FIG. 4.

The current driver 8 includes a constant current source configured to generate a predetermined quantity of driving current $I_{LED}$, and is configured to be switchable between an on state and an off state. In the on state, the current driver 8 is configured to generate the driving current $I_{LED}$. In the off state, the current driver 8 is configured to suspend the supply of the driving current $I_{LED}$. The configuration of the current driver 8 is not restricted in particular. Rather, the current driver 8 may be configured using known techniques.

The control IC 100*b* is configured to switch the current driver 8 between the on state and the off state according to the first pulse signal G1. Furthermore, a detection voltage that corresponds to the voltage drop across the current driver 8, i.e., the cathode voltage $V_{LED}$ of the light emitting element 6, is fed back to the LED terminal of the control IC 100*b*. The control IC 100*b* is configured to switch on and off the switching transistor M1 such that the detection voltage $V_{LED}$ matches the target voltage $V_{REF}$. The control IC 100*b* may have the same configuration as that of the control IC 100.

With the light emitting apparatus 3*b* employing such a current driver 8, by resetting the oscillator 20 according to the first pulse signal G1, such an arrangement is capable of suppressing the back electromotive force $V_{LX}$ having a large amplitude in the PWM dimming control operation.

[Third Modification]

The light emitting element 6 is not restricted to such an LED string. Rather, various kinds of known or prospectively available light emitting elements may be employed.

[Fourth Modification]

Description has been made in the embodiment regarding an arrangement in which the light emitting apparatus 3 is employed as a backlight of a liquid crystal panel. However, the present invention is not restricted to such an arrangement. For example, the light emitting apparatus 3 is applicable to illumination devices.

[Fifth Modification]

Description has been made in the embodiments regarding a non-insulated switching power supply employing the inductor L1. Also, the present invention can be applied to an insulated switching power supply employing a transformer.

[Sixth Modification]

The settings of the signals, such as the high-level state and the low-level state of the signals, have been described in the present embodiments for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A control circuit used for a light emitting apparatus comprising a light emitting element and a switching power supply configured to supply a driving voltage to one end of the light emitting element, and configured to control a switching transistor included in the switching power supply, and to switch on and off a driving current that flows through the light emitting element, the control circuit comprising:

a first driver configured to receive a first pulse signal which is pulse width modulated according to a target luminance level of the light emitting element, supplied from a circuit external to the control circuit, and to switch on and off the driving current according to the first pulse signal;

an oscillator configured to generate a cyclic signal having a predetermined frequency;

a pulse modulator configured to generate a second pulse signal, wherein the second pulse signal transits to an on level that corresponds to an on state of the switching transistor in synchronization with the cyclic signal, and transits to an off level that corresponds to an off state of the switching transistor according to at least one voltage that develops at a node of the light emitting apparatus which is supplied as a feedback voltage; and a second driver configured to switch on and off the switching transistor according to the second pulse signal, wherein the oscillator is configured to be reset according to a first edge which is a transition of the first pulse signal from a first level that corresponds to the off state of the light emitting element to a second level that corresponds to its on state.

2. The control circuit according to claim 1, further comprising a reset circuit configured to receive the first pulse signal, and (i) when a first level period immediately before the first edge of the first pulse signal is longer than a predetermined period of time, to reset the oscillator at a timing of the first edge, and otherwise (ii) when the first level period immediately before the first edge of the first pulse signal is shorter than the predetermined period of time, to reset the oscillator after the predetermined period of time elapses after the occurrence of a second edge which is a transition of the first pulse signal from the second level to the first level immediately before the first edge.

3. The control circuit according to claim 2, wherein the reset circuit comprises:

a timer circuit configured to generate a delay signal having a level which changes after the predetermined period of time elapses after the second edge occurs in the first pulse signal; and a logical gate configured to reset the oscillator according to the first pulse signal and the delay signal.

4. The control circuit according to claim 1, wherein the light emitting apparatus further comprises a dimming switch and a first resistor arranged in series between the other end of the light emitting element and a fixed voltage terminal, and wherein the control circuit further comprises an error amplifier configured to amplify the difference between a first detection voltage that corresponds to a voltage drop across the first resistor and a reference voltage, so as to generate a feedback signal, and wherein the pulse modulator is configured to adjust a duty ratio of the second pulse signal according to the feedback signal, and wherein the first driver is configured to switch on and off the dimming switch according to the first pulse signal.

5. The control circuit according to claim 4, wherein the pulse modulator comprises:

a duty controller configured to assert an off signal according to the feedback signal; and a flip-flop configured to receive the cyclic signal and the off signal, and to generate the second pulse signal.

6. The control circuit according to claim 5, wherein the duty controller is configured to assert the off signal according to a second detection voltage that corresponds to a current that flows through a coil of the switching power supply, in addition to according to the feedback signal.

7. The control circuit according to claim 6, wherein the switching power supply further comprises a second resistor arranged in series with the switching transistor, and wherein the second detection voltage is generated according to a voltage drop across the second resistor.

8. The control circuit according to claim 1, wherein the light emitting apparatus further comprises a current driver connected to the other end of the light emitting element, and configured to be switchable between an on state in which a driving current is generated, and an off state in which the supply of the driving current is suspended, and wherein the control circuit further comprises an error amplifier configured to amplify a difference between a first detection voltage that corresponds to a voltage drop across the current driver and a reference voltage, so as to generate a feedback signal, and wherein the pulse modulator is configured to adjust the duty ratio of the second pulse signal according to the feedback signal, and wherein the first driver is configured to switch the current driver between the on state and the off state according to the first pulse signal.

9. The control circuit according to claim 8, wherein the pulse modulator comprises:

a duty controller configured to assert an off signal according to the feedback signal; and a flip-flop configured to receive the cyclic signal and the off signal, and to generate the second pulse signal.

10. The control circuit according to claim 9, wherein the duty controller is configured to assert the off signal according to a second detection voltage that corresponds to a current that flows through a coil of the switching power supply, in addition to according to the feedback signal.

11. The control circuit according to claim 10, wherein the switching power supply further comprises a second resistor arranged in series with the switching transistor, and wherein the second detection voltage is generated according to a voltage drop across the second resistor.

12. The control circuit according to claim 1, wherein the second driver comprises:

a logical gate configured to perform a logical operation on the second pulse signal and the first pulse signal; and a main driver configured to switch on and off the switching transistor according to an output signal of the logical gate.

13. The control circuit according to claim 1, monolithically integrated on a single semiconductor substrate.

14. The control circuit according to claim 1, wherein the light emitting element is configured as an LED string comprising a plurality of light emitting diodes connected in series.

15. A light emitting apparatus comprising:
a light emitting element; and
a switching power supply configured to supply a driving voltage to one end of the light emitting element,
wherein the switching power supply comprises:
a switching transistor; and
the control circuit according to claim 1, configured to switch on and off the switching transistor.

16. An electronic device comprising:
a liquid crystal panel; and
the light emitting apparatus according to claim 15, arranged as a backlight of the liquid crystal panel.

17. A control method for a light emitting apparatus comprising a light emitting element and a switching power supply configured to supply a driving voltage to one end of the light emitting element, for controlling a switching transistor included in the switching power supply, and for switching on and off a driving current that flows through the light emitting element, the control method comprising:

generating a first pulse signal which is pulse width modulated according to a target luminance level of the light emitting element;

switching on and off the driving current according to the first pulse signal;

an oscillator generating a cyclic signal having a predetermined frequency;

switching a second pulse signal to an on level that corresponds to the on state of the switching transistor in synchronization with the cyclic signal;

switching the second pulse signal to an off level that corresponds to the off state of the switching transistor according to at least one voltage that develops at a node of the light emitting apparatus which is supplied as a feedback voltage;

switching on and off the switching transistor according to the second pulse signal; and resetting the oscillator according to a first edge which is a transition of the first pulse signal from a first level that corresponds to the off state of the light emitting element to a second level that corresponds to its on state.

18. The control method according to claim 17, wherein, in the resetting the oscillator, (i) when a first level period immediately before the first edge of the first pulse signal is longer than a predetermined period of time, the oscillator is reset at a timing of the first edge, and otherwise (ii) when the first level period immediately before the first edge of the first pulse signal is shorter than the predetermined period of time, the oscillator is reset after the predetermined period of time elapses after the occurrence of a second edge which is a transition of the first pulse signal from the second level to the first level immediately before the first edge.

* * * * *